J. FOX.
CONNECTING ROD.
APPLICATION FILED APR. 28, 1910.
1,070,594.
Patented Aug. 19, 1913.
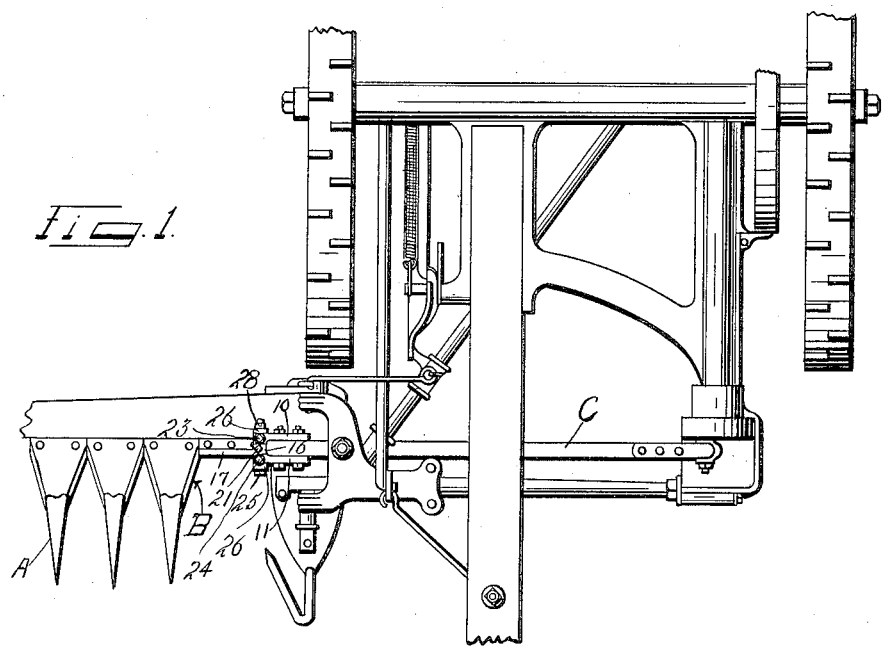
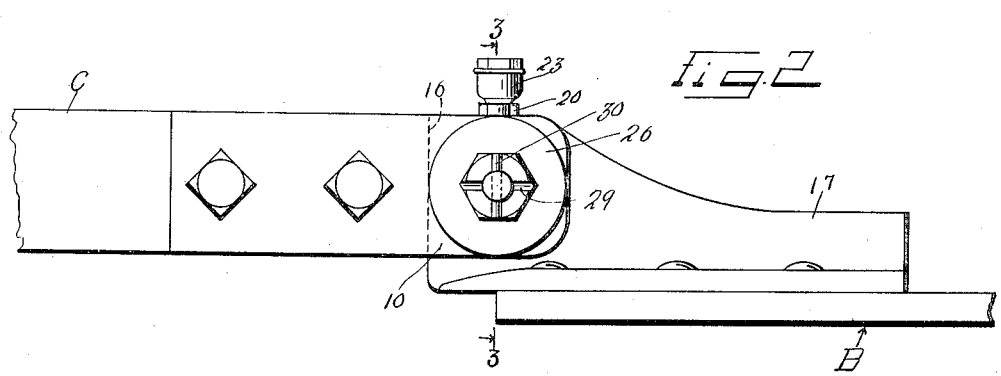
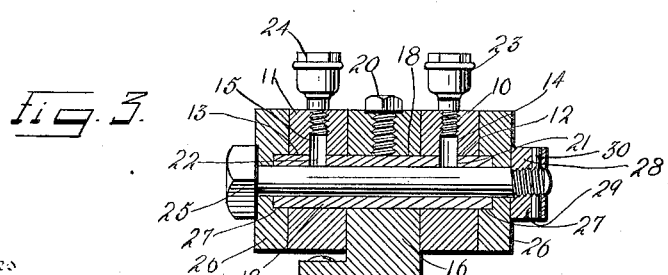
Inventor
John Fox.
Witnesses
By
Attorneys

UNITED STATES PATENT OFFICE.

JOHN FOX, OF LENORA, KANSAS.

CONNECTING-ROD.

1,070,594.

Specification of Letters Patent.

Patented Aug. 19, 1913.

Application filed April 23, 1910. Serial No. 558,200.

*To all whom it may concern:*

Be it known that I, JOHN FOX, a citizen of the United States, residing at Lenora, in the county of Norton, State of Kansas, have invented certain new and useful Improvements in Connecting-Rods; and I do hereby declare the following to be a full, clear, and exact description of the invention, such as will enable others skilled in the art to which it appertains to make and use the same.

This invention relates to connecting rods for mowing machines and the like, and particularly to an improved construction for securing the sickle to the pitman.

The object of the invention resides in an improved construction for connecting the pitman and sickle of a mowing machine or the like which will be simple, easy to assemble, of great strength and durability in use and in which the lubricated portions of the connection are protected from dust.

With the above and other objects in view the invention consists in the details of construction and in the arrangement and combination of parts to be hereinafter more fully set forth and described.

In describing the invention in detail reference will be had to the accompanying drawings wherein like characters of reference denote corresponding parts in the several views; and in which, Figure 1 is a plan view of a fragment of a mowing machine with the invention incorporated; Fig. 2, an enlarged side elevation of the improved connection between the sickle head and pitman of the machine shown in Fig. 1; and, Fig. 3, a section on the line 3—3 of Fig. 2.

Referring to the drawings, A represents the finger bar of the machine, B the sickle supported thereby and C the reciprocating pitman which is actuated in the usual manner through connections with other portions of the machine not shown. Bolted to the pitman C at its free end is a pair of spaced members 10 and 11 which are provided at their outer ends with horizontal apertures 12 and 13 respectively and vertical apertures 14 and 15 which communicate respectively with the apertures 12 and 13. Disposed between the members 10 and 11 at their outer ends is the end 16 of the sickle head 17; said end 16 being provided with a horizontal aperture 18 in registration with the apertures 12 and 13.

Passing through the apertures 12, 13 and 18 is a sleeve 19 which is held in non-rotative engagement with the head 16 by means of a set screw 20 which passes through the end 16 and impinges upon said sleeve. Passing through the sleeve at each end and communicating with the bore thereof are apertures 21 and 22 which register with the apertures 14 and 15 respectively of the members 10 and 11. Mounted in the upper end of the aperture 14 is an oil cup 23 while a corresponding oil cup 24 is mounted in the upper end of the aperture 15; said oil cups being adapted to feed lubricant through the apertures 14, 21 and 15, 22 to the bearing surfaces of the sleeve 19 as will be apparent. Passing through the bore of the sleeve 19 is a bolt 25 which carries thereon at each end of said sleeve washers 26 having their inner faces provided with recesses 27 for the reception of adjacent ends of the sleeve 19 whereby the bearings constituted by said sleeve, pivoted members and sickle head are rendered dust proof. Mounted on the threaded end of the bolt 25 is a nut 28 provided on its outer end with transverse recesses 29 for the reception of a locking pin 30 which projects through the bolt and thus secures the nut 28 against displacement therefrom.

What is claimed is:

The combination of a pitman, plates secured to the opposite sides thereof and extending beyond one end, said plates having enlargements formed thereon and engaging the end of the pitman, a reciprocating member interposed between the extended ends of the plates, the reciprocating member and plates having alining apertures formed therein, a sleeve located in said apertures, a bolt extended through said reciprocating member and engaging the sleeve, and holding the same against rotation, the plates and sleeve having alining apertures formed therein, oil cups threaded in the apertures formed in the plates, washers engaging the sides of the plates and provided with recesses receiving the ends of the sleeve, and a bolt passing through said washers and sleeve to retain the parts against displacement.

In testimony whereof, I affix my signature, in presence of two witnesses.

JOHN FOX.

Witnesses:
A. L. BREEDEN,
C. E. EDINBOROUGH.